United States Patent [19]

Takizawa

[11] 3,854,730

[45] Dec. 17, 1974

[54] CONTROL MECHANISM FOR PHONOGRAPH RECORD PLAYER

[75] Inventor: Kazuyuki Takizawa, Inzai-machi, Japan

[73] Assignee: Sony Corporation, Tokyo, Japan

[22] Filed: Dec. 18, 1973

[21] Appl. No.: 425,831

[30] Foreign Application Priority Data

Dec. 29, 1972 Japan .................................. 48-556

[52] U.S. Cl. ............................................. 274/15 R
[51] Int. Cl. ........................................... G11b 17/06
[58] Field of Search ............ 274/15 R, 1 L, 14, 9 R, 274/23 R

[56] References Cited

UNITED STATES PATENTS

| | | | |
|---|---|---|---|
| 2,300,149 | 10/1942 | Guedon | 274/23 R |
| 2,594,563 | 4/1952 | Johnson | 274/15 R |
| 2,961,242 | 11/1960 | Zimmermann et al. | 274/23 R |
| 3,174,754 | 3/1965 | Puls | 274/15 R |
| 3,342,499 | 9/1967 | Fukuda et al. | 274/15 R |
| 3,433,486 | 3/1969 | Kawaharazaki | 274/15 R |

*Primary Examiner*—Harry N. Haroian
*Assistant Examiner*—John W. Shepperd
*Attorney, Agent, or Firm*—Lewis H. Eslinger; Alvin Sinderbrand

[57] ABSTRACT

In a phonograph record player having a turntable rotatable by a motor, and a tone arm for carrying a pickup with a stylus to track the groove of a record on the turntable and being mounted for swinging movement across the turntable and for raising and lowering of the tone arm relative to the turntable between an elevated rest position outside the perimeter of the turntable and an inner position corresponding to the engagement of the pickup stylus in the final non-recorded groove portion of a record; there is provided a control mechanism including a switch for controlling the motor, a switch actuator for turning-on the switch, and thereby operating the motor, in response to initial inward swinging of the tone arm from its rest position, a rotatable control member, preferably in the form of a gear, rotated from an initial position by the turntable upon the operation of a detector in response to the arrival of the tone arm at its inner position, a main lever connected with the rotatable control member, preferably by a pin on the lever riding in a cam groove on the control member, so that the lever is turned from a starting position to a displaced position and then returned to its starting position in response to a complete revolution of the control member, with turning of the lever from its starting position to its displaced position being effective to restore the tone arm to its rest position, and a member on the lever for delaying the turning-off of the switch until the restoration of the lever to its starting position in response to the return of the control member to its initial position. Such member on the lever may further carry a brake by which the return movement of the tone arm to its rest position is frictionally slowed.

14 Claims, 7 Drawing Figures

CONTROL MECHANISM FOR PHONOGRAPH RECORD PLAYER

BACKGROUND OF THE INVENTION

1. Field of the Invention

This invention relates generally to a phonograph record player, and more particularly is directed to an improved control mechanism for a phonograph record player by which the tone arm thereof is automatically lifted and returned to its rest position when the tracking of the final non-recorded groove portion of the record by the pickup stylus is detected.

2. Description of the Prior Art

An existing automatic control mechanism for returning the tone arm of a phonograph record player to its rest position, as aforesaid, generally comprises a pinion mounted on the turntable shaft and being engageable with the peripheral teeth of a control gear for rotating the latter through a complete revolution from an initial position in which a gap in the gear teeth faces toward the pinion, a detecting device operative in response to the arrival of the tone arm at an inner position corresponding to the tracking of the final non-recorded groove portion of a record for initiating the rotation of the control gear from the driven turntable, as by a clutch device, an operating arm connected with the control gear and actuated by rotation of the latter for causing the return of the tone arm to its rest position. However, such existing control mechanism involves a large number of component parts so that its assembly and maintenance are unduly complicated. Further, in the existing control mechanism for automatically returning the tone arm to its rest position, as aforesaid, the return movement of the tone arm to its rest position occurs during the first half-revolution of the control gear, so that it is necessary to continue the driving of the turntable by the drive motor for restoring the control gear and the other component parts of the mechanism to their initial positions after the return of the tone arm to its rest position. In order to achieve the foregoing, some existing automatic control mechanisms for phonograph record players include a first switch through which the drive motor for the turntable is operated so long as the tone arm is displaced from its rest position, and a second switch through which the drive motor is further operated following the return of the tone arm to its rest position until the various component parts of the control mechanism are restored to their initial positions. With the foregoing arrangement involving two switches, it is apparent that the changeover of the operation of the drive motor from one switch to the other must be precisely controlled for avoiding stalling of the turntable drive, and this leads to complexities in the devices provided for actuating the switches, and also to susceptibility to improper or defective operation. Further, since the tone arm is returned to its rest position during the initial half-revolution of the control gear, the return movement of the tone arm is rapidly effected with the result that the tone arm forcibly engages the support therefor at the rest position and is apt to rebound therefrom.

Still other existing automatic control mechanisms for phonograph record players employ a control gear having diametrically opposed gaps in its peripheral teeth and two clutch devices respectively associated with such gaps so that one clutch device initiates the first half-revolution of the control gear during which the tone arm is returned to its rest position and, thereupon, the other clutch device is engaged to initiate the further half-revolution of the control gear during which the control gear and the other component parts of the mechanism are restored to their initial positions. However, the use of two clutch devices introduces undesirable complexity into the control mechanisms. Further, these control mechanisms, in effecting the rapid return movement of the tone arm to its rest position during a half-revolution of the control gear, also have the disadvantage of causing the forceful engagement of the tone arm with the support provided therefor at its rest position.

SUMMARY OF THE INVENTION

Accordingly, it is an object of this invention to provide an improved automatic control mechanism for a phonograph record player which avoids the above described disadvantages of the mechanisms previously provided for automatically returning the tone arm to its rest position at the completion of the playing of a phonograph record.

More specifically, it is an object of this invention to provide a relatively simple and reliable automatic control mechanism for a phonograph record player by which the tone arm is automatically returned to its rest position upon detection of the arrival of the tone arm at an inner position corresponding to the tracking of the final non-recorded groove portion of a record, and in which the operation of the drive motor for the turntable is continued through a single simple switch following the return of the tone arm to its rest position until all of the component parts of the automatic control mechanism are restored to their initial positions.

Another object is to provide an automatic control mechanism for a phonograph record player, as aforesaid, by which the tone arm is smoothly and softly placed upon the support provided therefor at the rest position when the tone arm is returned to such rest position.

In accordance with one aspect of this invention, an automatic control mechanism for a phonograph record player, as aforesaid, comprises a single switch having ON and OFF conditions for rendering the turntable drive motor operative and inoperative, respectively, switch operating means for establishing the OFF condition of the switch when the tone arm is initially in its rest position and for establishing the ON condition of the switch in response to at least a predetermined lateral swinging movement of the tone arm from its rest position, detecting means operative in response to the arrival of the tone arm at its inner position corresponding to the tracking of the final non-recorded groove portion of a record, a rotatable control member rotated from an initial position by the turntable in response to operation of the detecting means, a main lever connected with the rotatable control member so as to be turned from a starting position to a displaced position and then returned to its starting position in response to a complete revolution of the rotatable control member from its initial position, cooperatively engageable means on the main lever and tone arm assembly for returning the tone arm to its rest position in response to turning of the main lever to its displaced position, and means on such main lever for preventing the establishment of the OFF condition of the switch by the switch operating means when the main lever is displaced from its starting position, whereby the turntable drive motor continues to operate until all of the component parts of the control mechanism are restored to their original positions.

A preferred embodiment of the invention is featured by a first lever arm swingable with the tone arm, a second lever arm pivoted on the previously mentioned main lever and urged to a normal position relative to the latter, with the second lever arm being displaced from such normal position in response to displacement of the main lever from its starting position, and the mounting of the switch on one of the above mentioned lever arms while the switch operating means is disposed on the other of the lever arms for establishing the OFF condition of the switch only when the tone arm is in its rest position and the second lever arm is in its normal position relative to the main lever restored to the starting position of the latter.

A further important feature of an automatic control mechanism for a phonograph record player according to this invention is the provision of a brake which frictionally slows the return movement of the tone arm to its rest position, and which preferably includes a brake shoe mounted on the above mentioned second lever arm and engageable with an annular member turnable with the tone arm for both frictionally resisting the return movement of the tone arm to its rest position and for displacing the second lever arm from its normal position relative to the main lever until such time as the latter is restored to its starting position.

The above, and other objects, features and advantages of the invention, will be apparent in the following detailed description of illustrative embodiments thereof which is to be read in connection with the accompanying drawings.

DESCRIPTION OF THE PREFERRED EMBODIMENTS

Figures 1, 2:
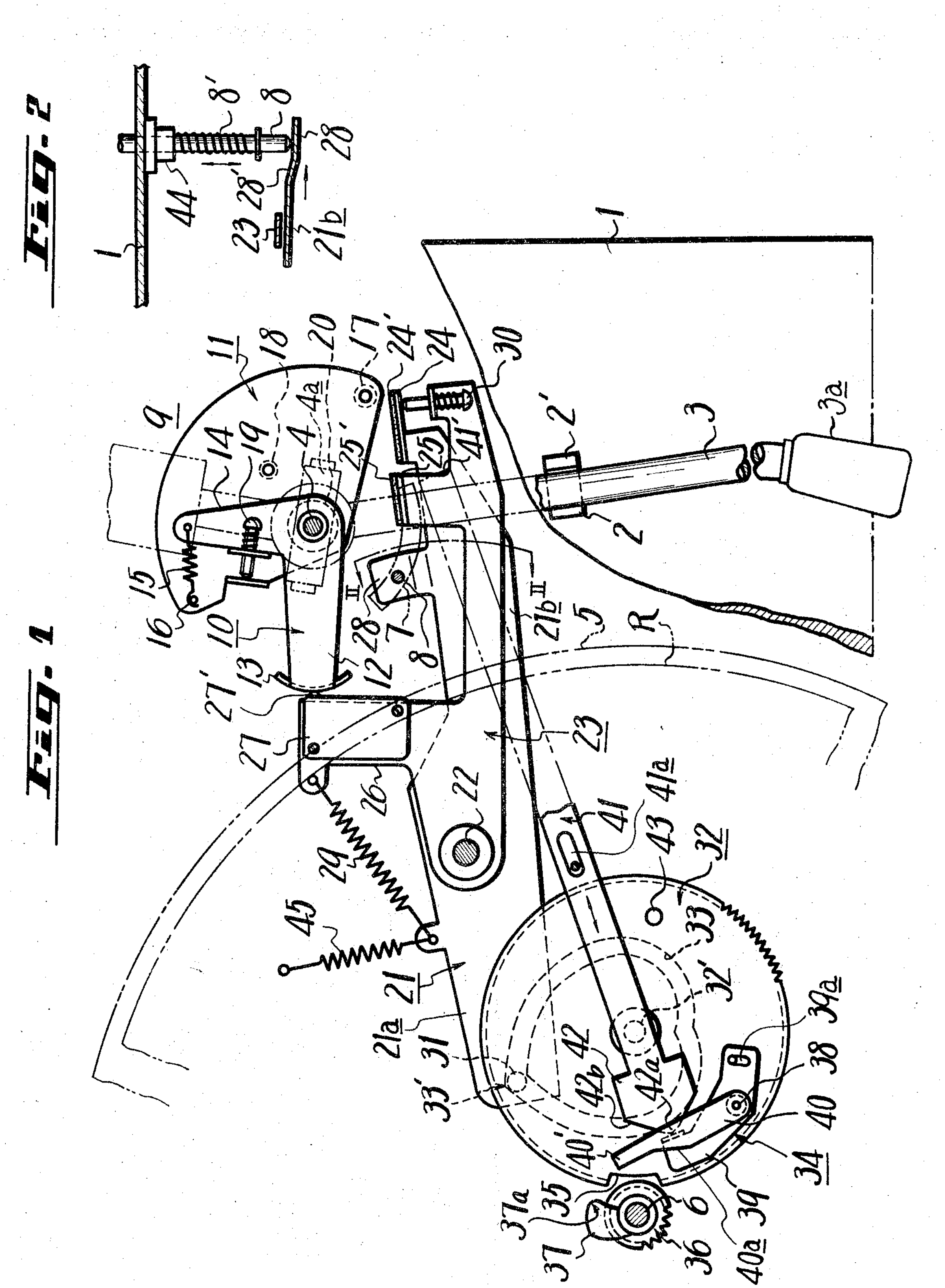
FIG. 1 is a fragmentary top plan view, partly in section, of a phonograph record player having an automatic control mechanism according to this invention, and being shown with its tone arm in the rest position thereof prior to the playing of a record.
FIG. 2 is a detail sectional view taken along the line II—II on FIG. 1.

Referring to the drawings in detail, and initially to FIG. 1 thereof in which only those parts of a phonograph record player necessary to an understanding of this invention are illustrated, it will be seen that such phonograph record player generally comprises a frame 1 having an arm rest or support 2 thereon for supporting a tone arm 3 in an elevated rest position outside the perimeter of a turntable 5 (shown in broken lines) which is rotatable above frame 1 on a driving shaft or spindle 6 suitably journalled in bearings (not shown) carried by the frame. The tone arm 3 is mounted adjacent one end, as by a gimbal 4*a* shown in broken lines, on a vertical rotatable shaft 4 supported in bearings carried by frame 1 so that the tone arm 3 carrying a conventional pickup 3*a* at its free end is capable of lateral swinging movement across turntable 5 and also capable of being raised and lowered relative to the turntable between the elevated rest position outside the perimeter of the turntable, as shown in FIG. 1, and an inner position indicated in broken lines at 3' on FIG. 3 and which corresponds to the engagement of the stylus (not shown) of pickup 3*a* in the conventional final non-recorded groove portion of a record R on turntable 5. The turntable 5 is adapted to be driven by a motor M (FIG. 7) either through a direct connection of such motor to shaft or spindle 6 or through a suitable transmission, such as, a belt or the like. An arcuate arm lifter 7 shown in broken lines on FIG. 1 extends under tone arm 3 in all positions of the latter and is mounted on the upper end of a vertically movable shaft 8 which is slidable in a bearing 44 carried by frame 1 and urged downwardly by a helical spring 8' (FIG. 2).

In a phonograph record player having an automatic control mechanism 9 according to this invention, as shown on FIG. 1, the rotatable support shaft 4 to which tone arm 3 is coupled has a bellcrank 10 fixed thereto below frame 1 and a drive member 11, for example, in the form of the illustrated sector-shaped plate, mounted on shaft 4 below bellcrank 10 and being free to turn relative thereto. The bellcrank 10 includes lever arms 12 and 14 extending substantially at right angles to each other, and an arcuate flange 13 depends from the end of lever arm 12 to form a switch operating member. A spring 15 is connected between the end of lever arm 14 and an anchor pin 16 on drive member 11 so as to yieldably urge shaft 4 and bellcrank 10 to turn with drive member 11 in a position relative to the latter in which a stop screw 19 adjustably carried by lever arm 14 engages against a lug 11*a* on drive member 11, as shown. A relatively short pin or roller 17 for actuating a detecting device, as hereinafter described in detail, depends from sector-shaped drive member 11 adjacent the outer end of the radial edge of the latter which is substantially diametrically opposed to lever arm 12 of bellcrank 10 in the normal spring-urged relative position of bellcrank 10 and drive member 11. Another relatively longer pin or roller 18 depends from the central portion of sector-shaped drive member 11 and, as hereinafter described, is adapted to transmit rotary torque to drive member 11 during that period of operation of control mechanism 9 when tone arm 3 is being returned to its rest position on support 2. An annular member 20 constituting a brake band or collar is fixed on shaft 4 below drive member 11 and is frictionally engaged, as hereinafter described, for resisting the turning of shaft 4 and bellcrank 10 with drive member 11 during the return movement of tone arm 3 to its rest position.

Figures 4, 5:
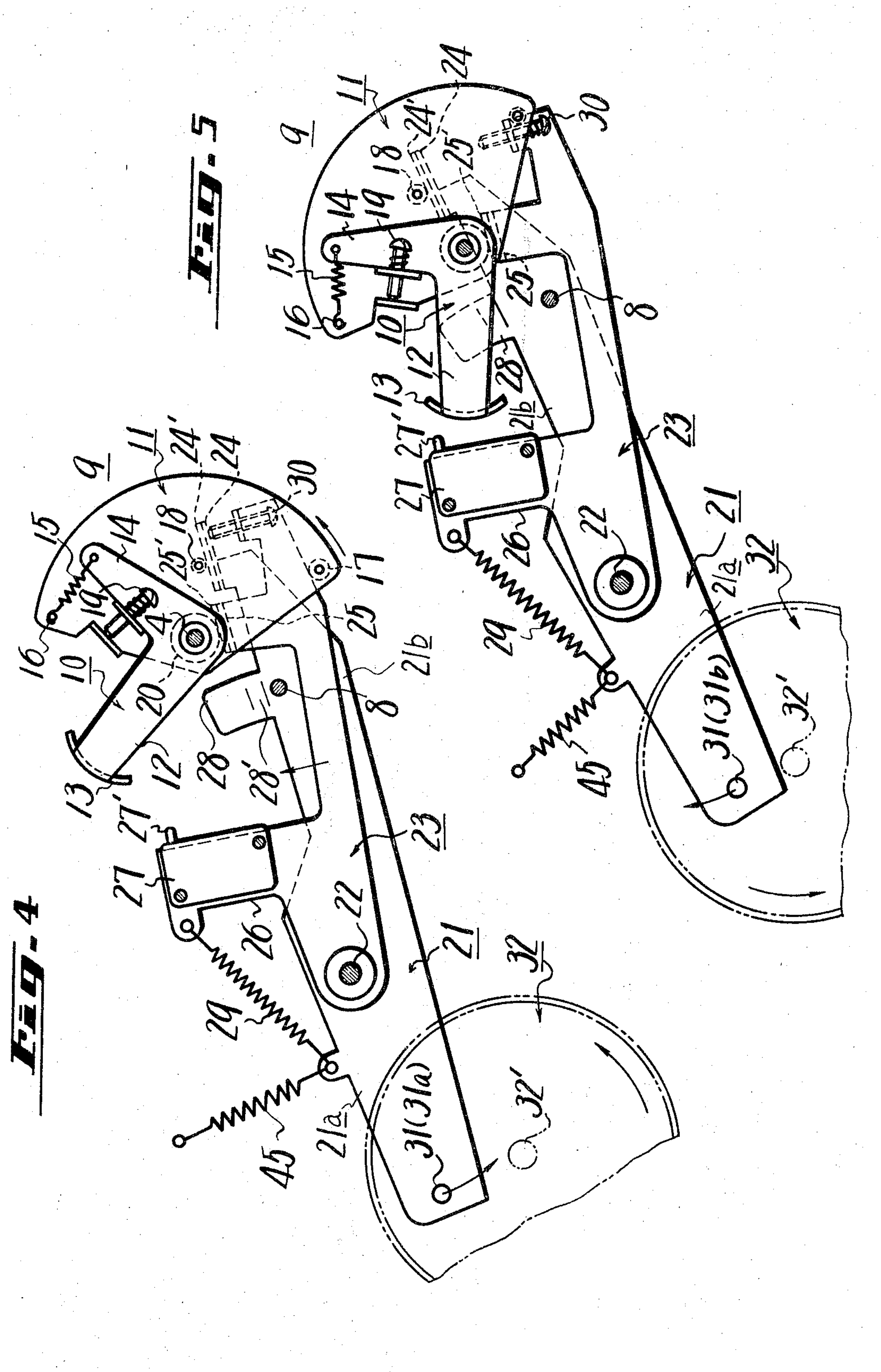
FIG. 4 is another view similar to that of FIG. 1, but showing the condition of the automatic control mechanism at the commencement of the return movement of the tone arm toward its rest position.
FIG. 5 is still another view similar to that of FIG. 1, but showing the condition of the automatic control mechanism upon the completion of the return movement of the tone arm to its rest position.

The automatic control mechanism 9 according to this invention is further shown to include a main lever 21 pivoted, intermediate its ends, on a pivot pin 22 depending from frame 1 so as to be turnable between a starting position (FIG. 1) and a displaced position (FIG. 5). Main lever 21 is shown to extend generally laterally and to include substantially opposed arms 21*a* and 21*b* which respectively extend toward the axis of turntable 5 and toward drive member 11 in front of shaft 4 at a level below the relatively short pin 17 depending from drive member 11. Arm 21*b* of main lever 21 is longitudinally dimensioned so that an upstanding flange 24 extending from its free end portion and faced with a pad 24′ will be engageable against pin 18 depending from drive member 11 upon turning of main lever 21 from its starting position to its displaced position, as hereinafter described in detail. A lever arm 23 is pivotally mounted, at one end, on pivot pin 22 above main lever 21 and generally overlies arm 21*b* of the main lever. Lever arm 23 is formed with an upstanding flange 25 adjacent its free end, and such flange 25 is faced with a pad or brake shoe 25′ which is engageable with brake band 20 secured on shaft 4 during the turning of main lever 21 from its starting position to its displaced position for frictionally resisting, and thereby slowing the return movement of tone arm 3 to its rest position, as hereinafter described. Lever arm 23 has a rearwardly directed extension 26, and a spring 29 is connected between extension 26 and main lever 21 at which a stop screw 30 adjustably carried by the free end of lever arm 23 engages against flange 24 at the free end of arm 21*b*.

A microswitch 27 is mounted on extension 26 of lever arm 23 and is provided with a switch actuator 27′ engageable by switch operating member 13 on bell-crank 10 only when tone arm 3 is in its rest position and lever arm 23 is in its normal position relative to main lever 21 in the starting position of the latter, as shown on FIG. 1. As shown on FIG. 7, switch 27 is interposed in the energizing circuit of drive motor M for turntable 5 and has ON and OFF conditions for rendering drive motor M operative and inoperative, respectively. The actuator 27′ of switch 27 is conventionally urged to project from the switch housing, as on FIGS. 3–5, for establishing the ON condition of switch 27, and the OFF condition of the switch is established only when switch actuator 27′ is depressed or retracted as a result of its engagement by switch operating member 13.

Arm 21*b* of main lever 21 is further shown to have a rearwardly directed extension 28, which, as shown on FIG. 2, is at a lower level than the remainder of arm 21*b* and is connected to the latter by an inclined ramp portion 28′. With main lever 21 in its starting position, as shown on FIGS. 1 and 2, extension 28 of arm 21*b* extends under the bottom end of rod 8 which is urged downwardly by spring 8′ against extension 28 so as to dispose arm lifter 7 at a relatively low position. With arm lifter 7 in such relatively low position, tone arm 3 can be manually removed from its rest position on support 2 and lowered to engage the stylus of pickup 3*a* with the groove of record R adjacent the periphery of the latter. However, when main lever 21 is turned from its starting position toward its displaced position, as hereinafter described, extension 28 of arm 21*b* is moved rearwardly from under rod 8 so that the latter is successively engaged by the inclined ramp portion 28′ and then by the arm 21*b* (FIGS. 4 and 5) which is at a relatively high level and thus moves rod 8 upwardly against the force of spring 8′ for causing arm lifter 7 to raise tone arm 3 to the level of its rest position and thereby disengage the pickup stylus from the record.

The automatic control mechanism according to this invention is further shown to include a rotatable control member in the form of a gear 32 rotatable on a shaft 32′ depending from frame 1 and located so that the periphery of gear 32 is adjacent turntable drive shaft 6. The underside of gear 32 is formed with a cam groove 33 in which there engages or rides a cam follower pin 31 directed upwardly from the free end of arm 21*a* of main lever 21. Cam groove 33 may be heart-shaped, as shown, or otherwise provided with a cusp 33′ which is engaged by pin 31 in an initial position of gear 32 for establishing the starting position of main lever 21, as shown on FIG. 1. The control gear 32 is shown to have a gap or recess 35 in its peripheral teeth, which gap, in the initial position of gear 32, faces toward a pinion 36 fixed on turntable drive shaft 6 so that pinion 36 can rotate with turntable 5 independently of control gear 32. In order to initiate rotation of control gear 32 from its initial position, a clutch device 34 is mounted on gear 32 and, in the engaged condition of clutch device 34, a drive member 37 extending radially from shaft 6 and rotatable therewith above pinion 36 acts against clutch device 34 so as to angularly displace gear 32 to an extent sufficient to bring the peripheral teeth of gear 32 into meshing engagement with pinion 36.

The clutch device 34 is shown to include a clutch element 39 pivoted on a pin 38 projecting from the upper surface of gear 32 for angular displacement in respect to the latter, which angular displacement is limited, as by a pin and slot connection 39*a*. Element 39 frictionally contacts the upper surface of gear 32 so as to tend to remain in any position relative to gear 32 to which element 39 is forcibly displaced. Clutch device 34 further includes a clutch arm 40 pivoted, at one end, on pin 38 above clutch element 39 and extending from pivot pin 38 to the vicinity of gap 35 in the teeth of gear 32. Clutch arm 40 frictionally engages the upper surface of clutch element 39 so as to tend to move angularly with the latter. In the disengaged condition of clutch device 34, the free end 40′ of clutch arm 40 is outside the orbit or path of movement of drive member 37 on shaft 36 so that drive member 37 may rotate with shaft 6 without acting on clutch device 34. However, when clutch device 34 is shifted to its engaged condition, as shown on FIG. 3 and hereinafter described in detail, the free end 40′ of clutch arm 40 is projected into the orbit or path of drive member 37 so that the latter acts against end 40′ of clutch arm 40 for initiating the rotation of gear 32 from its initial position. The return of clutch device 34 to its gear. condition is effected as gear 32 nears its initial position in the course of a full revolution of such gearn. More specifically, as gear 32 nears its initial position, an arcuate edge 37*a* on drive member 37 acts against an oblique portion 40*a* of the outer edge of clutch arm 40 to return the latter and also element 39, to the positions shown on FIG. 1 from the positions shown on FIG. 3.

Figures 3, 6, 7:
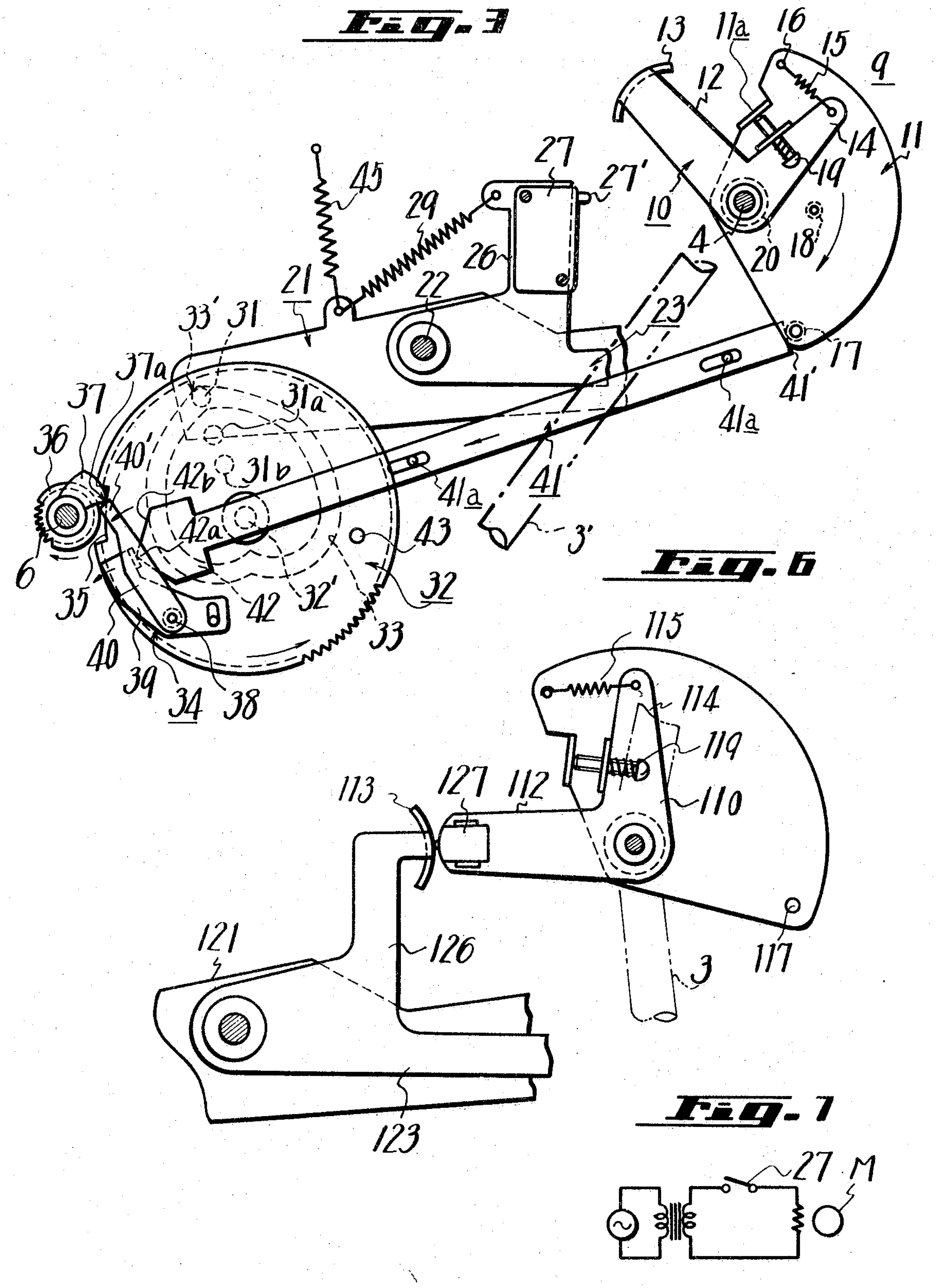
FIG. 3 is a view similar to that of FIG. 1, but showing the condition of the automatic control mechanism at the moment when the detecting device thereof detects the tracking of the final non-recorded groove portion of a phonograph record.
FIG. 6 is a fragmentary top plan view showing another embodiment of the invention.
FIG. 7 is a schematic diagram showing a circuit for energizing the turntable drive motor.

The clutch device 34 is shifted from its disengaged condition to its engaged condition upon operation of a detecting device in response to the arrival of the tone arm at its inner position indicated at 3′ on FIG. 3 and which corresponds to the tracking by the stylus of pickup 3*a* of the final non-recorded groove portion of record R. In the illustrated embodiment of this invention, the detecting device is shown to include an elongated rod 41 which is mounted under frame 1, as by pin and slot connections 41*a*, so as to be longitudinally reciprocable in a path that extends generally from the location of pin 17 on drive member 11 when the tone arm is in its inner position 3' to adjacent element 39 of clutch device 34. The end of rod 41 adjacent clutch device 34 is shown to be formed with an enlarged head 42 having a V-shaped end edge defining an apex 42*a* engageable with clutch element 39 and converging flanks 42*b* leading to apex 42*a*. It will be seen that, when the tone arm is moved to its inner position 3', pin 17 depending from drive member 11 acts against the adjacent end 41' of rod 41 to displace the latter toward the left, as viewed on FIG. 3, and thereby to cause the apex 42*a* of head 42 to act against clutch element 39 for angularly displacing the latter in the counterclockwise direction about pivot pin 38. By reason of the frictional engagement of clutch arm 40 with clutch element 39, clutch arm 40 is similarly displaced in the counterclockwise direction to project its free end 40' into the path of drive member 37. In order to return the detecting rod 41 to the position shown on FIG. 1 from the position shown on FIG. 3, a pin 43 extends upwardly from control gear 32 and is movable in a circular path with gear 32 so as to ride along one of the flanks 42*b* of head 42 and thereby displace rod 41 toward the right, as viewed on the drawings.

Finally, a spring 45 is connected between main lever 21 and frame 1 so as to urge lever 21 in the clockwise direction about pivot pin 22, that is, in the direction urging cam follower pin 31 radially away from the center of gear 32. Thus, when control gear 32 is in its initial position, as shown on FIG. 1, cam follower pin 31 is engaged into cusp 33' of cam groove 33 to resist inadvertent displacement of gear 32 from its initial position at which gap 35 faces pinion 36. By reason of the foregoing, rotation of control gear 32 from its initial position can only occur in response to the previously described displacement of detecting rod 41 for shifting clutch device 34 to its engaged condition.

A phonograph record player provided with the above described automatic control mechanism according to this invention operates as follows:

Starting with the various component parts of the record player in the positions shown on FIG. 1, the operation of the phonograph record player is initiated by manually removing tone arm 3 from its rest position on support 2 and swinging tone arm 3 inwardly, that is, in the clockwise direction about shaft 4, and lowering the tone arm so as to engage the stylus of pickup 3*a* in the groove of the record R adjacent the periphery of the latter. In the course of such movement of tone arm 3, bellcrank 10 turns in the clockwise direction with shaft 4 so as to disengage switch operating member 13 from the actuator 27' of switch 27, and thereby to establish the ON condition of switch 27 for effecting operation of drive motor M. Thus, turntable 5 is rotated with the record R thereon. During the rotation of record R on turntable 5, the stylus of pickup 3*a* tracks the spiral groove of the record in which sounds are recorded so that pickup 3*a* progressively moves toward the center of the record and tone arm 3 progressively swings in the clockwise direction about the axis of shaft 4. Bellcrank 10 turns with shaft 4 as a result of such swinging of tone arm 3 and, through spring 15, drive member 11 is made to follow the turning of bellcrank 10.

Upon the completion of the playing of the record R, the stylus of pickup 3*a* engages the conventional final non-recorded groove portion near the center of the record and tone arm 3 arrives at its corresponding inner portion indicated at 3' on FIG. 3. The arrival of tone arm 3 at its inner position 3' brings drive member 11 to the position shown on FIG. 3 at which pin 17 acts against the adjacent end 41' of detecting rod 41 for shifting the latter toward the left, as viewed on the drawing, and thereby causing the apex 42*a* of head 42 to angularly displace clutch element 39 in the counterclockwise direction about pin 38 and to similarly angularly displace clutch arm 40. Thus, clutch device 34 is shifted to its engaged condition (FIG. 3) in which the end 40' of clutch arm 40 is engaged by drive member 37 on rotated shaft 6, and gear member 32 is angularly displaced from its initial position for bringing its peripheral teeth into meshing engagement with rotated pinion 36. Thereafter, gear 32 is turned in the counterclockwise direction by rotated pinion 36 and, by reason of the heart-shaped configuration of cam groove 33, cam follower pin 31 is moved progressively inward toward the center of gear 32 through the position 31*a* (FIG. 4) to the position 31*b* (FIG. 5) which pin 31 attains at approximately the completion of one-half revolution of gear 32 from its initial position. Such movement of cam follower pin 31 turns main lever 21 in the counterclockwise direction from its starting position shown on FIG. 1 so that pads 24' and 25' on flanges 24 and 25 of lever 21 and lever 23 are moved rearwardly toward pin 18 on drive member 11 and brake band 20 on shaft 4, respectively. In the course of the turning of main lever 21 from the starting position of FIG. 1 to the position shown on FIG. 4, arm 21*b* of main lever 21 is moved under rod or shaft 8 so as to elevate the latter and thereby cause arm lifter 7 to raise tone arm 3 for disengaging the stylus of pickup 3*a* from the record. As main lever 21 arrives at the position shown on FIG. 4, pad 24' on flange 24 of lever 21 and pad or brake shoe 25' on flange 25 of lever arm 23 substantially simultaneously come into engagement with pin 18 and brake band 20, respectively. Thereafter, during further counterclockwise turning of main lever 21 to its displaced position shown on FIG. 5, pad 24' on flange 24 of lever 21 moves rearwardly against pin 18 for turning drive member 11 in the counterclockwise direction from the position shown on FIGS. 3 and 4 to the position shown on FIG. 5. During the further turning of main lever 21 from the position shown on FIG. 4 to the position shown on FIG. 5, lever arm 23 cannot participate in such turning of the main lever 21 by reason of the engagement of the brake shoe 25' with brake band 20. Thus, during the described counterclockwise turning of drive member 11 to the position shown on FIG. 5, lever member 23 is angularly displaced against the force of spring 29 away from its normal position relative to main lever 21. Of course, during such angular displacement of lever arm 23 from its normal position relative to main lever 21, spring 29 holds brake shoe 25 firmly against brake band 20 on shaft 4 so that the turning of shaft 4, bellcrank 10 and tone arm 3 with drive member 11 is frictionally resisted. By reason of the foregoing frictional resistance or braking force, the turning of bellcrank 10, shaft 10 and tone arm 3 in the counterclockwise direction lags or is slowed relative to the turning of drive member 11 from the position of FIG. 4 to the position of FIG. 5 and spring 15 is extended or loaded. Therefore, during movement of drive member 11 to the position of FIG. 5, tone arm 3 is relatively slowly swung outwardly while being raised by arm lifter 7 and is returned to its rest position on support 2 where the previously described loading of spring 15 ensures the smooth and soft engagement of the tone arm with the stop 2' provided at the outer side of the support or rest 2.

It will be noted that the above described return of tone arm 3 to its rest position occurs relatively slowly during one-half-revolution of gear 32, and that, at the completion of such half-revolution of gear 32, bellcrank 10 and the switch operating member 13 thereon are restored to their original positions. However, as shown on FIG. 5, the restoration of switch operating member 13 to its original position does not result in its engagement with switch actuator 27' by reason of the fact that main lever 21 is displaced from its starting position and lever arm 23 carrying switch 27 on its extension 26 is displaced from its normal position relative to main lever 21. Thus, switch 27 continues in its ON condition so that motor M continues to operate to drive shaft 6 and, through the pinion 36 thereon, to drive control gear 32. As the rotation of gear 32 is continued, pin 43 thereon acts against flank **42*b* on the head 42 of detecting rod 41 for displacing the latter toward the right to the position shown on FIG. 1.**

During the second half-revolution of control gear 32, cam follower pin 31 is moved radially outward in respect to the center of gear 32 from the position **31*b* (FIG. 5) toward the position shown on FIG. 1 so as to turn main lever 21 in the clockwise direction toward its starting position, and further to permit spring 29 to restore lever arm 23 to its original position relative to main lever 21. As gear 32 nears the completion of the full revolution, arcuate edge surface 37*a* on drive member 37 acts against edge portion 40*a* of clutch arm 40 for angularly displacing the latter in the clockwise direction about pin 38 and for similarly angularly displacing clutch element 39 in frictional contact with arm 40, whereby clutch device 34 is restored to its disengaged condition. Finally, upon the return of control gear 32 to its initial position (FIG. 1) actuator 27' of switch 27 is engaged by switch operating member 13 for establishing the OFF condition of switch 27 and thereby halting the operation of drive motor M. The force of spring 45 on main lever 21 and the consequent engagement of cam follower pin 31 in cusp 33' of cam groove 33 ensures that, upon the halting of operation of drive motor M with gear 32 restored to its initial position, inertia will not cause control gear 32 to move past the initial position in which gap 35 of its teeth again faces pinion 36.**

It will be apparent from the above description of the structure and operation of an automatic control mechanism according to this invention that such mechanism, while being composed of a relatively simple assemblage of comparatively few component parts, is capable of achieving the automatic relatively slow return of the tone arm to its rest position at the completion of the playing of a record and thereafter achieves the return of all of the component parts to their original positions while employing only a single switch for controlling the energization of the drive motor.

In the embodiment of this invention described with reference to FIGS. 1–5, the single switch 27 has been mounted on the lever arm 23 which also carries the brake shoe 25' and the switch operating member 13 has been mounted on the lever arm 12 of the bellcrank 10 secured to the tone arm shaft 4. However, as shown on FIG. 6, the positions of the switch and switch operating member can be reversed. More specifically, as shown on FIG. 6 in which the various parts are identified by the same reference numerals used in identifying the corresponding parts in the embodiment of FIGS. 1–5, but with the numeral 1 as a prefix therefor, the switch 127 may be mounted on the lever arm 112 of bellcrank 110 and the switch operating member 113 may be provided on the extension 126 of the lever arm 123. Apart from the foregoing, the other parts of the embodiment shown on FIG. 6 are similar to the corresponding parts of the first described embodiment, and the operation of the embodiment of FIG. 6 is also similar.

In the above described embodiments of this invention, a mechanical detecting device consisting of the detecting rod 41 and the depending pin 17 on drive member 11 is employed for detecting the tracking by the pickup stylus of the final non-recorded groove portion of the record. However, in automatic control mechanisms according to this invention, the tracking of the final non-recorded groove portion of the record may be otherwise detected, for example, by a magnetically sensitive element, such as, a Hall device, or by a photoelectric conversion element, such as, a phototransistor, so as to cause an associated electrical circuit to energize a solenoid for shifting the clutch device 34 to its engaged condition. In the case of a detecting means employing a magnetically sensitive element, such as a Hall device, the latter may respond to the arrival of the tone arm 3 at its inner position 3', with the resulting variation of the resistance of the Hall device being detected through a differential circuit providing an output which is amplified to energize the previously mentioned solenoid.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In a phonograph record player for use with a phonograph record having a spiral groove with sounds recorded therein leading to a final non-recorded groove portion, and which includes a frame, a turntable rotatable on said frame, a motor operative for driving the turntable, a tone arm assembly having a tone arm for carrying a pickup with a stylus to track the groove of a record on said turntable, and means mounting said tone arm on said frame for lateral swinging movement across said turntable and for raising and lowering of the tone arm relative to said turntable between an elevated rest position outside the perimeter of said turntable and an inner position corresponding to the engagement of the pickup stylus in said first non-recorded groove portion of a record; a control mechanism comprising switch means having ON and OFF conditions for rendering said motor operative and inoperative, respectively, switch operating means for establishing said OFF condition of the switch means when said tone arm is initially in said rest position and for establishing said ON condition of the switch means in response to at least a predetermined lateral swinging movement of said tone arm from said rest position, detecting means operative in response to the arrival of said tone arm at said inner position thereof, a rotatable control member rotated from an initial position by said turntable in response to operation of said detecting means, a lever connected with said rotatable control member so as to be turned from a starting position to a displaced position and then returned to said starting position in response to a complete revolution of said control member starting from said initial position, cooperatively engageable means on said lever and tone arm assembly for returning said tone arm to said rest position in response to turning of said lever to said displaced position, and means on said lever for preventing the establishment of said OFF condition of the switch means by said switch operating means when said lever is displaced from said starting position thereof.

2. A phonograph record player according to claim 1; in which said tone arm assembly includes a first lever arm swingable with said tone arm, and said means on the lever for preventing the establishment of said OFF condition of the switch means includes a second lever arm pivoted on said lever and urged to a normal position relative to the lever, with said second lever arm being displaced from said normal position relative to said lever in response to displacement of said lever from said starting position of the latter; and in which said switch means is mounted on one of said lever arms and said switch operating means is disposed on the other of said lever means for establishing said OFF condition of the switch means only when said tone arm is in said rest position and said second lever arm is in said normal position relative to said lever in the starting position of the latter.

3. A phonograph record player according to claim 2; further comprising braking means on said tone arm assembly and said second lever arm which are cooperatively engageable during turning of said lever from said starting position to said displaced position of the lever for braking the return movement of said tone arm to said rest position.

4. A phonograph record player according to claim 3; in which said braking means includes an annular member turnable with said tone arm in response to lateral swinging of the latter and a brake shoe on said second lever arm moved against said annular member by movement of said lever toward said displaced position of the latter for frictionally resisting turning of said annular member and for displacing said second lever arm from said normal position relative to said lever.

5. A phonograph record player according to claim 4; in which said switch means is mounted on said second lever arm and has a switch actuating member, and said switch operating means is disposed on said first lever arm for engaging said switch actuating member and thereby establishing said OFF condition only when said tone arm is in said rest position and said second lever arm is in said normal position relative to said lever in said starting position of the latter.

6. A phonograph record player according to claim 2; in which said switch means includes an actuating member engageable by said switch operating means for establishing said OFF condition only when said tone arm is in said rest position and said second lever arm is in said normal position relative to said lever in said starting position of the latter.

7. A phonograph record player according to claim 6; in which said switch means is mounted on said second lever arm and said switch operating means is disposed on said first lever arm.

8. A phonograph record player according to claim 6; in which said switch means is mounted on said first lever arm and said switch operating means is disposed on said second lever arm.

9. A phonograph record player according to claim 1; further comprising braking means operative during turning of said lever from said starting position to said displaced position of the lever for braking the return movement of said tone arm to said rest position.

10. A phonograph record player according to claim 1; in which a pinion is rotatable with said turntable, said rotatable control member is constituted by a gear having peripheral teeth engageable by said pinion with a gap in said teeth facing toward said pinion in said initial position of said rotatable control member, said gear further has a cam groove therein formed with a cusp, said lever has a pin thereon riding in said cam groove and engaging said cusp when said rotatable control member is in said initial position to dispose said lever in said starting position of the latter, and spring means acts on said lever to urge said pin into engagement with said cusp for retaining said rotatable control member in said initial position.

11. A phonograph record player according to claim 10; in which said rotatable control member has clutch means thereon movable between engaged and disengaged conditions, said pinion has a drive member rotatable therewith and operable to act against said clutch means in said engaged condition of the latter for incremental movement of said rotatable control member from said initial position and thereby meshing said pinion with said teeth of the gear, and said detecting means is operative to shift said clutch means from its disengaged condition to said engaged condition.

12. A phonograph record player according to claim 11; in which said detecting means includes a rod engageable at one end with said clutch means for shifting the latter from said disengaged condition to said engaged condition, and said tone arm assembly includes means acting on the other end of said rod in said inner position of the tone arm for causing said one end of the rod to engage and shift said clutch means.

13. A phonograph record player according to claim 1; in which said tone arm assembly includes lifting means operative for raising said tone arm to the level of said rest position, and actuating means on said lever for operating said lifting means in response to displacement of said lever from said starting position of the latter.

14. A phonograph record player according to claim 1; in which said means mounting the tone arm on the frame includes a rotatable shaft to which said tone arm is coupled, said tone arm assembly includes a drive member turnable relative to said shaft and spring means yieldably urging said shaft to turn with said drive member, and said cooperatively engageable means include an abutment on said lever engageable against said drive member to turn the latter in the direction for returning said tone arm to said rest position; and further comprising braking means operative during turning of said lever from said starting position to said displaced position of the lever for frictionally resisting turning of said shaft with said drive member, whereby to slow the return movement of said tone arm.

* * * * *